(12) United States Patent
Yamane et al.

(10) Patent No.: US 8,900,711 B2
(45) Date of Patent: Dec. 2, 2014

(54) FLUOROOXYALKYLENE GROUP-CONTAINING POLYMER COMPOSITION, A SURFACE TREATMENT AGENT COMPRISING THE SAME AND AN ARTICLE TREATED WITH THE AGENT

(75) Inventors: Yuji Yamane, Annaka (JP); Yasunori Sakano, Annaka (JP); Koichi Yamaguchi, Takasaki (JP); Noriyuki Koike, Takasaki (JP); Hirofumi Kishita, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 732 days.

(21) Appl. No.: 13/226,987

(22) Filed: Sep. 7, 2011

(65) Prior Publication Data

US 2012/0077041 A1   Mar. 29, 2012

(30) Foreign Application Priority Data

Sep. 28, 2010 (JP) .................. 2010-217915

(51) Int. Cl.
| | | |
|---|---|---|
| C08L 71/00 | (2006.01) | |
| C08G 65/336 | (2006.01) | |
| C08G 65/00 | (2006.01) | |
| C08G 77/24 | (2006.01) | |
| C08G 77/46 | (2006.01) | |
| C09D 171/02 | (2006.01) | |

(52) U.S. Cl.
CPC ............. *C08G 77/46* (2013.01); *C08G 65/336* (2013.01); *C08G 65/007* (2013.01); *C08G 2650/48* (2013.01); *C08G 77/24* (2013.01); *C09D 171/02* (2013.01)
USPC ............ 428/421; 525/447; 525/185; 525/418

(58) Field of Classification Search
USPC .......................................... 525/191
See application file for complete search history.

(56) References Cited

U.S. PATENT DOCUMENTS

| 7,196,212 B2 | 3/2007 | Yamaguchi et al. |
| 7,601,428 B2 | 10/2009 | Yamane et al. |
| 2011/0098402 A1 | 4/2011 | Yamane et al. |

FOREIGN PATENT DOCUMENTS

| JP | A-58-167597 | 10/1983 |
| JP | A-2000-143991 | 5/2000 |
| JP | A-2003-238577 | 8/2003 |
| JP | A-2007-297589 | 11/2007 |
| WO | WO 2009/008380 A1 | 1/2009 |

OTHER PUBLICATIONS

Dec. 5, 2012 partial English-language translation of Office Action issued in Japanese Application No. 2010-217915.
Extended European Search Report issued in European Application No. 11182448.8 on Mar. 5, 2012.
Japanese Patent Application No. 2009-247032 filed Oct. 27, 2009.

*Primary Examiner* — Doris Lee
(74) *Attorney, Agent, or Firm* — Oliff PLC

(57) ABSTRACT

A fluorooxyalkylene group-containing polymer composition including a liner fluorooxyalkylene group-containing polymer represented by the formula (1) which has a hydrolysable group at a terminal and is hereinafter called "one-terminal modified polymer", and a liner fluorooxyalkylene group-containing polymer represented by the following formula (2) which has hydrolysable groups at the both terminals and is hereinafter called "both-terminal modified polymer", wherein an amount of the both-terminal modified polymer is 0.1 mole % or more and less than 10 mole %, relative to a total mole of the one-terminal modified polymer and the both-terminal modified polymer.

14 Claims, 2 Drawing Sheets

FLUOROOXYALKYLENE GROUP-CONTAINING POLYMER COMPOSITION, A SURFACE TREATMENT AGENT COMPRISING THE SAME AND AN ARTICLE TREATED WITH THE AGENT

CROSS REFERENCE

This application claims the benefits of Japanese Patent application No. 2010-217915 filed on Sep. 28, 2010 the contents of which are hereby incorporated by reference.

FIELD OF THE INVENTION

The present invention relates to a fluorooxyalkylene group-containing polymer composition, specifically, relates to a composition which forms a coating having good adhesiveness to a substrate, water- and oil-repellency, low dynamic friction, and good abrasion resistance, and relates to a surface treatment agent comprising the same and an article treated with the agent.

BACKGROUND OF THE INVENTION

Recently, there is an increasing need for technology to attain fingerprint proofness or easy removal of fouling on a surface of a display for better appearance or visibility. Thus, a material which meets these requirements is desired. In particular, a fingerprint smudge adheres easily to a surface of a touch panel display and, therefore, it is desired that a water- and oil-repellent layer is formed on the surface. However, a conventional water- and oil-repellent layer has a problem such that attrition resistance is poor so that the stain resistance deteriorate during use.

Compounds containing a perfluorooxyalkylene moiety generally have a very small surface free energy and, accordingly, have good water- and oil-repellency, chemical resistance, lubricity, releasing property, and antifouling property. Taking advantage of these properties, they are widely used as, for example, water- and oil-repellent agents or antifouling agents for paper or fiber, lubricants for magnetic storage media, oil repellents components for precision apparatuses, releasing agents, cosmetic, and protective coatings. These properties, on the other hand, mean that such compounds do not stick or closely adhere to other materials, either. Even if they can be applied to a material, it is difficult to have a coating closely adhered to the material.

Silane coupling agents are well known as an agent which bonds an organic compound to a surface of a substrate such as glass or a cloth. The silane coupling agents have an organic functional group and a reactive silyl group, usually an alkoxy silyl group, in a molecule. The alkoxy silyl group autocondenses in the presence of moisture in air to become a siloxane and forms a coating. At the same time, the alkoxy silyl group chemically and physically bonds to a surface of glass or metal to form a durable coating.

Japanese Patent Application Laid-Open No. Sho-58-167597 discloses that a fluoroaminosilane compound represented by the following formula is applied on glass to attain high water- and oil-repellency. However, the perfluorooxyalkylene moiety of this compound is relatively short, so that lubricity, a releasing property and an antifouling property are insufficient.

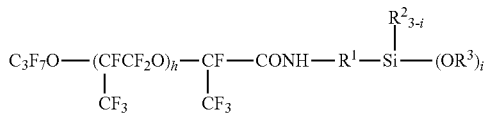

wherein $R^2$ and $R^3$ are alkyl groups having 1 to 4 carbon atoms, $R^1$ is $CH_2CH_2CH_2$ or $CH_2CH_2NHCH_2CH_2CH_2$, h is an integer of from 0 to 8, and "i" is 2 or 3.

Japanese Patent Application Laid-Open No. 2000-143991 discloses perfluoropolyether-modified aminosilane represented by the following formula, as a compound having a branched long perfluorooxyalkylene moiety. The perfluoropolyether-modified aminosilane has a high water- and oil-repellency. However, its stain resistance and lubricity are insufficient due to the branch structure in the main chain.

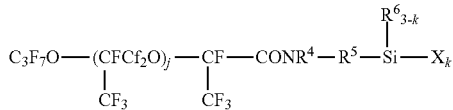

wherein X is a hydrolyzable group, $R^4$ is a monovalent hydrocarbon group, $R^6$ is a hydrogen atom or a monovalent hydrocarbon group, $R^5$ is an alkylene group optionally interrupted by an NH group, j is an integer of from 14 to 49, and k is 2 or 3.

Japanese Patent Application Laid-Open No. 2003-238577 discloses a perfluoropolyether-modified silane represented by the following formula, which has a liner perfluorooxyalkylene group. Lenses and anti-reflection films treated with the aforesaid perfluoropolyether-modified silane are good in lubricity, a releasing property and abrasion resistance. However, the lubricity intrinsic is not well exhibed due to the both terminals being fixed on a substrate.

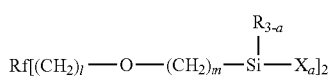

wherein Rf is a divalent linear perfluoropolyether group, R is an alkyl group having 1 to 4 carbon atoms or a phenyl group, X is a hydrolyzable group, l is an integer of from 0 to 2, m is an integer of from 1 to 5, and a is 2 or 3.

Japanese Patent Application Laid-Open No. 2007-297589 discloses a perfluoropolyether-modified silane represented by the following formula, as a treatment agent which has improved lubricity. However, this compound does not have a terminal fluorinated group, so that its water- and oil-repellency, dynamic friction and releasing property are inferior.

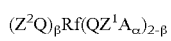

wherein Rf is a divalent perfluoroether-containing group, Q is a divalent organic group, $Z^1$ and $Z^2$ are organopolysiloxane moieties, A is a monovalent group having a terminal reactive silyl group, α is an integer of from 1 to 8, and β is the number larger than 0 and less than 2.

Patent literature 1: Japanese Patent Application Laid-Open No. Sho-58-167597
Patent literature 2: Japanese Patent Application Laid-Open No. 2000-143991
Patent literature 3: Japanese Patent Application Laid-Open No. 2003-238577

SUMMARY OF THE INVENTION

Problems to be Solved by the Invention

A water- and oil-repellent layer which covers a surface of a touch panel display requires a low coefficient of dynamic friction in view of abrasion resistance and removal of fingerprint. Thus, development for a water- and oil-repellent layer which has good abrasion resistance and a low coefficient of dynamic friction is desired. The present inventors invented a polymer composition which comprises a mixture of a fluorooxyalkylene group-containing polymer having a fluorine group at one terminal and a hydrolyzable group at the other terminal and a fluorooxyalkylene group-containing polymer having hydrolyzable groups at the both terminals, and forms a layer having good water- and oil repellency in Japanese Patent Application No. 2009-247032. An object of the present invention is to provide a fluorooxyalkylene group-containing polymer composition which can form a water- and oil-repellent layer having better abrasion resistance and a lower dynamic friction.

Means to Solve the Problems

A liner polymer having a fluorooxyalkylene group in the main chain and a hydrolysable group at one terminal of the molecular chain can give excellent abrasion resistance to a substrate, compared to a liner polymer having hydrolysable groups at the both terminals. A fluorooxyalkylene group-containing polymer whose main chain is composed of $—(OC_2F_4)_e(OCF_2)_fO—$ has a lower coefficient of dynamic friction. The present inventors have made research to solve the aforesaid problems and found that a composition which comprises a mixture of a fluorooxyalkylene group-containing polymer whose main chain is composed of $—(OC_2F_4)_e(OCF_2)_fO—$ and a hydrolysable group at one terminal and a fluorooxyalkylene group-containing polymer having hydrolysable groups at the both terminals, and has 0.1 mole % or more and less than 10 mole % of a fluorooxyalkylene group-containing polymer having hydrolysable groups at the both terminals can form a water- and oil-repellent layer having excellent abrasion resistance and a lower dynamic friction.

Thus, the present invention provides a fluorooxyalkylene group-containing polymer composition comprising a liner fluorooxyalkylene group-containing polymer represented by the following formula (1):

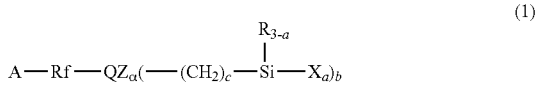

(1)

wherein Rf is represented by $—(CF_2)_d—(OC_2F_4)_e(OCF_2)_f—O(CF_2)_d—$, A is a monovalent fluorinated group having a $CF_3$ group at a terminal, Q is a divalent organic group, Z is a divalent to octavalent organopolysiloxane moiety having a siloxane bond, R is an alkyl group having 1 to 4 carbon atoms or a phenyl group, X is a hydrolysable group, a is 2 or 3, b is an integer of from 1 to 6, c is an integer of from 1 to 5, α is 0 or 1, d is, independently of each other, 0 or an integer of from 1 to 5, e is an integer of from 0 to 80, f is an integer of from 0 to 80, and a total of e and f is from 5 to 100, and these repeating units may be sequenced at random, said polymer being hereinafter called "one-terminal modified polymer", and a liner fluorooxyalkylene group-containing polymer represented by the following formula (2):

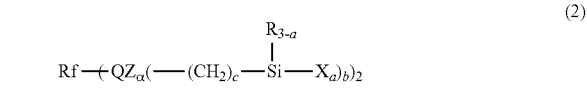

(2)

wherein Rf, Q, Z, R, X, a, b, c and α are as defined above, said polymer being hereinafter called "both-terminal modified polymer", wherein an amount of the both-terminal modified polymer is 0.1 mole % or more and less than 10 mole %, relative to a total mole of the one-terminal modified polymer and the both-terminal modified polymer.

Further, the present invention provides a method for preparing the fluorooxyalkylene group-containing polymer composition, wherein the method comprises a step of subjecting a mixture of a fluorooxyalkylene group-containing polymer having a carboxylic acid group at one terminal, hereinafter called "one-terminal carboxylic acid polymer", and a fluorooxyalkylene group-containing polymer having carboxylic acid groups at the both terminals, hereinafter called "both-terminal carboxylic acid polymer", to adsorption treatment and/or molecular distillation so as to attain 0.1 mole % or more and less than 10 mole % of the both-terminal carboxylic acid polymer, relative to a total mole of the one-terminal carboxylic acid polymer and the both-terminal carboxylic acid polymer.

Effects of the Invention

A coating obtained from the present fluorooxyalkylene group-containing polymer composition has excellent abrasion resistance and a lower coefficient of dynamic friction. A surface treatment agent comprising the present fluorooxyalkylene group-containing polymer composition can give good water- and oil-repellency and abrasion resistance, and lower dynamic friction to various articles.

BRIEF DESCRIPTION ON THE DRAWINGS

BEST MODES OF THE INVENTION

Figure 1:
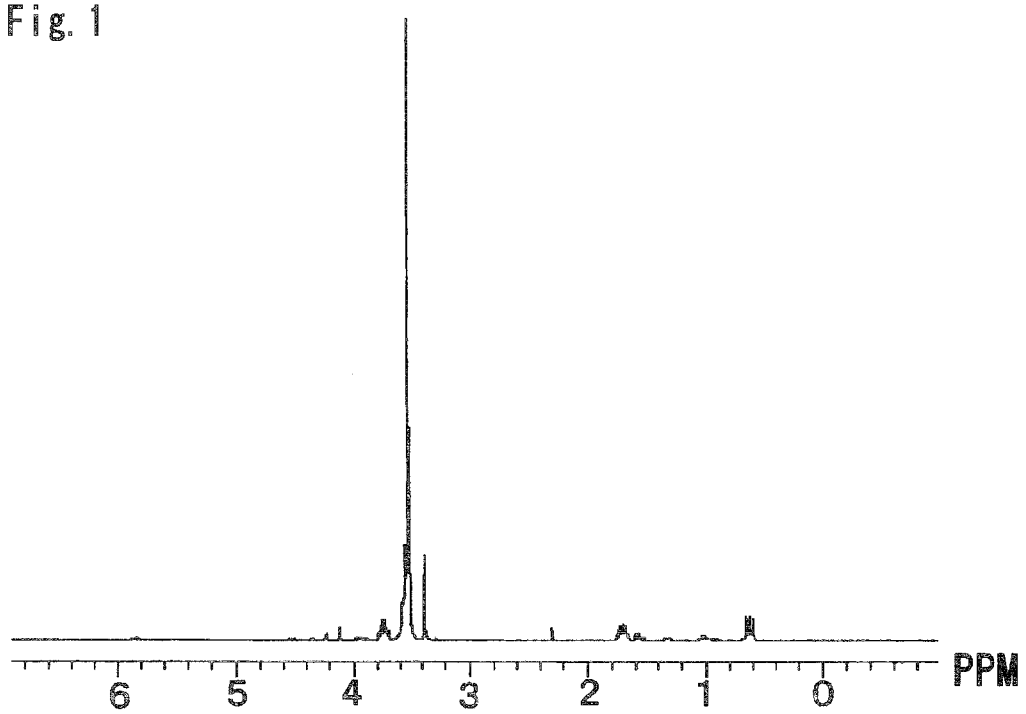
FIG. 1 is a chart of $^1$H-NMR spectra of the product prepared in Example 1.

The present invention is a fluorooxyalkylene group-containing polymer composition comprises a one-terminal modified polymer represented by the aforesaid formula (1) and a both-terminal modified polymer represented by the aforesaid formula (2) and is characterized in that an amount of the both-terminal modified polymer is 0.1 mole % or more and less than 10 mole %, preferably 0.3 to 9.9, more preferably 0.5 to 9.8, further more preferably 1 to 9.7 mole %, relative to a total mole of the one-terminal modified polymer and the both-terminal modified polymer. On account of the amount of the both-terminal modified polymer in the afore-mentioned ranges, a layer having good abrasion resistance can be formed. Further, the main chain of the fluorooxyalkylene group-containing polymer is composed of $—(CF_2)_d—(OC_2F_4)_e(OCF_2)_f—O(CF_2)_d$ and, thereby, can form a layer having a low coefficient of dynamic friction. In the afore-mentioned formula, d is, independently of each other, 0 or an integer of from 1 to 5, e is an integer of from 0 to 80, f is an integer of from 0 to 80, and a total of e and f is from 5 to 100, and these repeating units may be sequenced at random. The total of e and f is preferably from 10 to 80, more preferably from 15 to 60. If the total of e and f is larger than the afore-mentioned upper limit, the adhesiveness and the curability may be poor. If the total of e and f is less than the afore-mentioned lower limit, the properties of the fluorooxyalky-lene group cannot be provided sufficiently.

In the afore-mentioned formula (1), A is a monovalent fluorinated group having a $CF_3$ group at a terminal, preferably a liner perfluoro group having 1 to 6 carbon atoms. Among these, a $CF_3$ group is preferred.

In the afore-mentioned formulas (1) and (2), X is, independently of each other, a hydrolyzable group. Examples of X include alkoxy groups having 1 to 10 carbon atoms such as methoxy, ethoxy, propoxy and buthoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; and halogen atoms such as chlorine, bromine, and iodine atoms. Among these, methoxy, ethoxy, iropropenoxy groups and a chlorine atom are preferred.

In the afore-mentioned formulas (1) and (2), R is an alkyl group having 1 to 4 carbon atoms and a phenyl group. Among these, preferred is a methyl group. "a" is 2 or 3, preferably 3 in view of reactivity and adhesiveness to a substrate. "b" is an integer of from 1 to 6, preferably 1 to 3, and c is an integer of from 1 to 5, preferably 1 to 3.

In the afore-mentioned formulas (1) and (2), Q is a divalent organic group to link Rf with Z, or Rf with the $(CH_2)_c$ group. Preferred is an organic group having 2 to 12 carbon atoms which may have one or more bonds selected from an amide bond, an ether bond, an ester bond and a vinyl bond. More preferred is a substituted or unsubstituted hydrocarbon group having 2 to 12 carbon atoms which may have aforesaid bond, such as

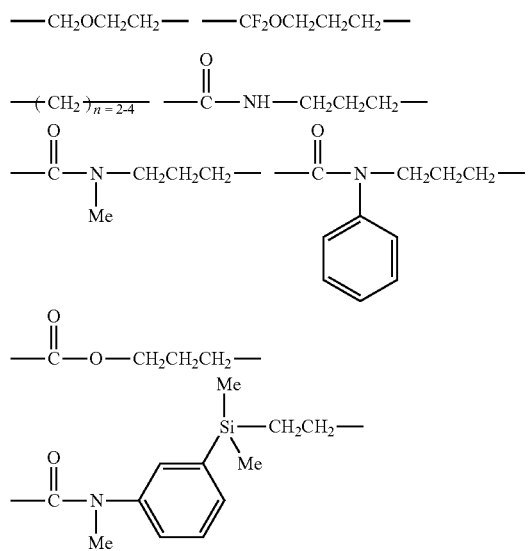

In the afore-mentioned formulas (1) and (2), Z is a divalent to octavalent organopolysiloxane moiety having a siloxane bond. Z is preferably a liner or cyclic organopolysiloxane moiety having 2 to 13 silicon atoms, preferably 2 to 5 silicon atoms. Z may contain a silalkylene structure where two silicon atoms are bonded via an alkylene group, that is, Si—$(CH_2)_n$—Si, wherein n is an integer of from 2 to 6. The present fluorooxyalkylene group-containing polymer composition has siloxane bonds in the molecule, so that the present composition can become a coating which has excellent attrition resistance and abrasion resistance.

Preferably, the organopolysiloxane moiety has an alkyl group having 1 to 8 carbon atoms, more preferably 1 to 4 carbon atoms, or a phenyl group. The alkylene group in the silalkylene bond preferably has 2 to 6 carbon atoms, more preferably 2 to 4 carbon atoms. Examples of Z include the following;

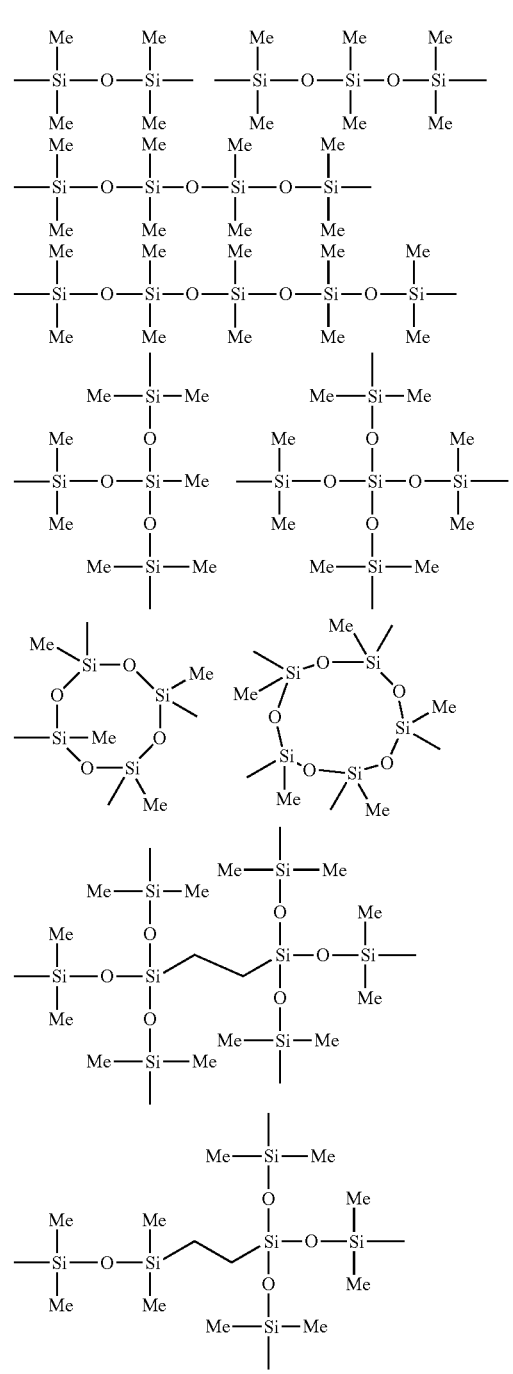

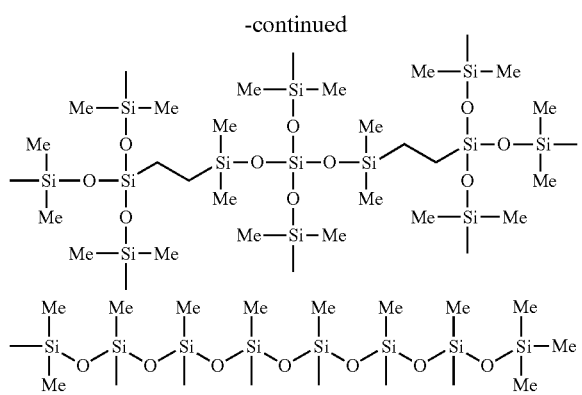

The fluorooxyalkylene group-containing polymer composition may further comprise a fluorooxyalkylene group-containing polymer represented by the following formula (3):

wherein Rf and A are as defined for formulas (1) and (2) mentioned above, hereinafter called "non-modified polymer".

When the present fluorooxyalkylene group-containing polymer composition comprises the afore-mentioned non-modified polymer, an amount of the one-terminal modified polymer is 80 mole % or more, preferably 84 mole % or more, more preferably 90 mole % or more and an amount of the both-terminal modified polymer is 0.1 mole % or more and less than 10 mole %, preferably 0.3 to 9.5 mole %, more preferably 0.5 to 9 mole %, further more preferably 1 to 9 mole %, relative to a total mole of the one-terminal modified polymer, the both-terminal modified polymer and the non-modified polymer. In particular, an amount of the non-modified polymer is preferably 1 to 15 mole %, more preferably 5 to 10 mole %.

The present fluorooxyalkylene group-containing polymer composition can be prepared from a mixture comprising a fluorooxyalkylene group-containing polymer having a carboxylic acid group at one terminal, hereinafter called "one-terminal carboxylic acid polymer", and a fluorooxyalkylene group-containing polymer having carboxylic acid groups at the both terminals, hereinafter called "both-terminal carboxylic acid polymer". The mixture may contain the fluorooxyalkylene group-containing polymer represented by the aforesaid formula (3). Examples of a mixture include a mixture comprising polymers represented by the following formulas (a) to (c), wherein $Rf^1$ is a group represented by $-(OC_2F_4)_e(OCF_2)_fO-$, and e and f are as defined above. As shown below, a terminal of a perfluorooxy compound having carboxylic groups at the both terminals is fluorinated to obtain the aforesaid mixture of polymers. The introduction of the terminal $CF_3$ group can be controlled by adjusting the amount of the fluorine gas supplied to control the fluorination.

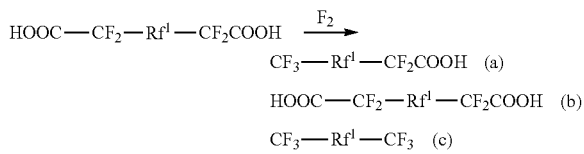

The method for preparing the present fluorooxyalkylene group-containing polymer composition is characterized in that the method comprises a step of subjecting a mixture comprising the one-terminal carboxylic acid polymer and the both-terminal carboxylic acid polymer to adsorption treatment and/or molecular distillation so as to attain 0.1 mole % or more and less than 10 mole %, preferably 0.3 to 9.5 mole %, more preferably 0.5 to 9 mole %, further more preferably 1 to 9 mole %, of the both-terminal carboxylic acid polymer, relative to a total mole of the one-terminal carboxylic acid polymer and the both-terminal carboxylic acid polymer. It has been difficult to prepare a composition comprising a polymer whose main chain is composed of $-(OC_2F_4)_e(OCF_2)_f-$ and which has a hydrolysable group at one terminal in a high concentration. In the present invention, a composition comprising the one-terminal carboxylic acid polymer in a high concentration is prepared by the aforesaid process and, thereby, the present invention provides a method for preparing a fluorooxyalkylene group-containing polymer composition having 0.1 mole % or more and less than 10 mole % of the both-terminal modified polymer, relative to a total mole of the one-terminal modified polymer and the both-terminal modified polymer.

Examples of the adsorption treatment include a method with an acid adsorbent such as anion exchange resins. In this method, the polymers having a carboxylic acid group(s) at the terminal(s) are adsorbed on an acid adsorbent which is dispersed in a fluorinated solvent. When a polymer mixture contains the non-modified polymer, the non-modified polymer is not adsorbed in this step. Then, the adsorbent is washed with a mixture of a fluorinated solvent and a strong acid. In this step, the strong acid is adsorbed on the adsorbent and, instead, the polymers having carboxylic acid group(s) at the terminal(s) are eluted into the fluorinated solvent, where the one-terminal carboxylic acid polymer is preferentially eluted, compared to the both-terminal carboxylic acid polymer, so that a composition obtained contains the one-terminal carboxylic acid polymer in a higher concentration can be obtained.

The acid adsorbent is used in an amount of 10 to 500 g per 100 g of a polymer mixture. The treatment for removing the non-modified polymer is carried out preferably at 10 to 40 degrees C. for 1 to 48 hours. The step of washing the adsorbent with a fluorinated solvent and a strong acid is conducted in such a manner that an appropriate quantity, such as 50 g, of the strong acid is added into a mixture of the fluorinated solvent and the adsorbent and stirred at 10 to 30 degrees C. for 0.5 to 3 hours. Examples of the strong acid used in this step may be hydrochloric acid, but not limited thereto. After stirred, the mixed liquid is left standing, allowing the mixture to separate into a lower fluorine phase and an upper phase of a mixture of the strong acid and the adsorbent. The fluorine phase is taken out and the fluorinated solvent is distilled off to obtain a composition comprising the one-terminal carboxylic acid polymer in a higher concentration.

Any known anion exchange resins, such as strongly basic resins, type I and type II, and weakly basic resins can be used, but are not limited thereto. For instance, a useful resin has main structure which is composed of a styrene/divinyl benzene cross-linked polystyrene, an acrylic acid polyacrylate, or a heat resistant aromatic polymer which has an ether group or a carbonyl group and into which an anion exchange group such as an amino group, a substituted amino group, a quaternary ammonium group or a carboxyl group is introduced. Examples of commercially available anion exchange resins include B20-HG, ex Organo Corporation, and DIAION SA series, PA300 series, PA400 series, UBA120 and HPA25, ex Mitsubishi Chemical Corporation.

Examples of the molecular distillation apparatus include a pot molecular distillation apparatus, a falling film molecular distillation apparatus, a centrifugal molecular distillation apparatus and a laboratory size centrifugal molecular distillation apparatus. Treatment conditions may be properly determined, and preferably a pressure of $10^{-5}$ to $10^{-1}$ Pa and a temperature of 150 to 400 degrees C. In this method, a polymer which has fewer functional groups at the molecular terminals evaporates in milder conditions, so that the non-modified polymer is separated first and, subsequently, the one-terminal carboxylic acid polymer is separated. The molecular distillation may be conducted in combination with the adsorption treatment. Ratios among the one-terminal carboxylic acid polymer, the both-terminal carboxylic acid polymer and non-modified polymer can be determined according to a molar ratio of —$CF_3$ groups and —$CF_2COOH$ groups, as determined by $^{19}F$-NMR analysis.

The present method for preparing a fluorooxyalkylene group-containing polymer composition will be described below in detail.

(i) The mixture comprising a fluorooxyalkylene group-containing polymer having a carboxylic acid group at one terminal and a fluorooxyalkylene group-containing polymer having carboxylic acid groups at the both terminals is subjected to the adsorption treatment and/or the molecular distillation so as to obtain a polymer composition comprising a fluorooxyalkylene group-containing polymer having a carboxylic acid group at one terminal in a higher concentration. Then, a substituted or unsubstituted $C_3$-$C_{17}$ hydrocarbon group having an unsaturated aliphatic group at the terminal is bonded to the terminal carboxylic groups of the afore-described polymers, forming an amide bond, an ether bond, an ester bond or a vinyl bond. The reaction may be carried out in any conventional manner. For instance, a fluorooxyalkylene group-containing polymer where the Rf group is bonded to the $(CH_2)_c$ group via —$CH_2OCH_2CH_2$— group, wherein c is 1, can be prepared in the following process. First, the terminal carboxylic acid group-containing polymer composition is subjected to a reduction with a metal hydride or a catalytic hydrogenation with a noble metal catalyst to obtain a composition comprising the following terminal hydroxyl group-containing polymers,

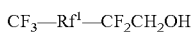

$CF_3$—$Rf^1$—$CF_2CH_2OH$

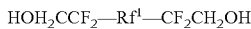

$HOH_2CCF_2$—$Rf^1$—$CF_2CH_2OH$

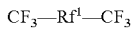

$CF_3$—$Rf^1$—$CF_3$ wherein $Rf^1$ is as defined above.

Then, an unsaturated aliphatic group is introduced at the terminal hydroxyl group(s) of the polymers. Examples of the unsaturated aliphatic group include alkenyl group having 2 to 16 carbon atoms. The introduction may be carried out in any conventional manner. For instance, the terminal hydroxyl group-containing polymer composition is reacted with a halogenated alkenyl compound such as brominated ally in the presence of tetrabutylammonium hydrogen sulfate, to which sodium hydroxide solution is then added dropwise to make the mixture alkaline to thereby obtain a composition comprising the following terminal unsaturated aliphatic group-containing polymers which has an alkenyl group such as an allyl group in the terminal(s),

$CF_3$—$Rf^1$—$CF_2CH_2OCH_2CH=CH_2$

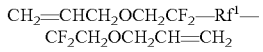

$CH_2=CHCH_2OCH_2CF_2$—$Rf^1$—
$CF_2CH_2OCH_2CH=CH_2$

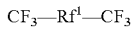

$CF_3$—$Rf^1$—$CF_3$ wherein $Rf^1$ is as defined above.

(ii) Subsequently, a hydrolyzable silyl group is introduced at the terminal unsaturated aliphatic group(s) of the polymers. This step is conducted in such a manner that the polymer composition comprising the terminal unsaturated aliphatic group-containing polymers prepared in the afore-described step is addition reacted with an organosilicon compound having an SiH bond at one terminal and a hydrolyzable group at the other terminal. The hydrolyzable group may be as described for X above. Examples of the organosilicon compound include terminal alkoxy group-containing organohydrogensilanes. For instance, in a case where the composition comprising the terminal unsaturated aliphatic group-containing polymers is reacted with trimethoxysilane, i.e., HSi$(OCH_3)_3$, a composition as described below is obtained. The addition reaction can be carried out in the presence of an addition reaction catalyst, such as a platinum compound, in any conventional manner,

$CF_3$—$Rf^1$—$CF_2CH_2OC_3H_6Si(OCH_3)_3$

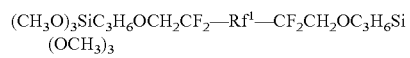

$(CH_3O)_3SiC_3H_6OCH_2CF_2$—$Rf^1$—$CF_2CH_2OC_3H_6Si(OCH_3)_3$

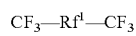

$CF_3$—$Rf^1$—$CF_3$ wherein $Rf^1$ is as defined above.

Alternatively, this step may be conducted in such a manner that the composition comprising the terminal unsaturated aliphatic group-containing polymers may be reacted with an organosilicon compound having plural SiH bonds, for instance 2 to 8 SiH groups. After the reaction, there are many remaining SiH bonds in a molecule of the polymers. Therefore, the remaining SiH groups may be reacted with an organosilicon compound having an unsaturated aliphatic group and a hydrolyzable group to increase the number of the terminal hydrolyzable groups.

Alternatively, this step may be conducted in such a manner that the composition comprising the terminal unsaturated aliphatic group-containing polymers is reacted with a 1:1 adduct of tetramethyldisiloxane (HM) with vinyltrimethoxysilane (VMS). On account of the reaction, a composition can be obtained which comprises the following polymers whose perfluorooxyalkylene group is bonding to a terminal hydrolyzable silyl group via a disiloxane structure. The addition reaction can be carried out in the presence of an addition reaction catalyst, such as a platinum compound, in any conventional manner.

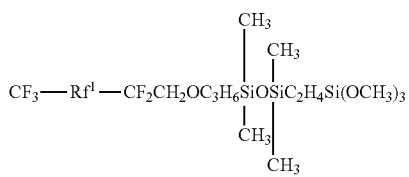

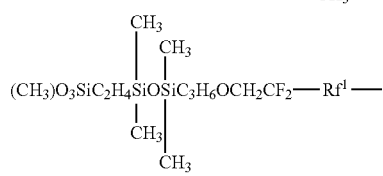

-continued

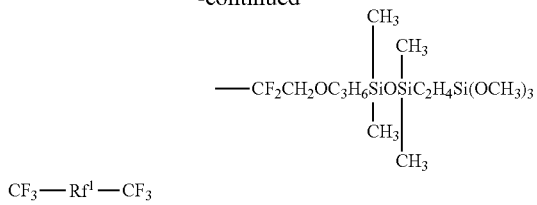

$$CF_3 — Rf^1 — CF_3$$

wherein $Rf^1$ is as defined above.

The present invention also provides a surface treatment agent comprising the aforesaid fluorooxyalkylene group-containing polymer composition. The surface treatment agent may contain a product which can be obtained by subjecting a part of the terminal hydrolyzable group(s) of the fluorooxyalkylene group-containing polymer composition to hydrolysis and condensation in a conventional manner.

The surface treatment agent may further contain a catalyst for hydrolysis and condensation reactions, if needed. Examples of the catalyst include organic tin compounds such as dibutyltin dimethoxide and dibutyltin dilaurate; organic titanium compounds such as tetra-n-butyl titanate; organic acids such as acetic acid, methanesulfonic acid and fluorinated carboxylic acid; and inorganic acids such as hydrochloric acid and sulfuric acid. Among these, preferred are acetic acid, tetra-n-butyl titanate, dibutyltin dilaurate and fluorinated carboxylic acid. A content of the catalyst may be a catalytic amount, which ranges typically from 0.01 to 5 parts by weight, particularly from 0.1 to 1 part by weight, per 100 parts by weight of the fluorooxyalkylene group-containing polymer composition and the product obtained by partial hydrolyzation and condensation of the polymer composition.

The surface treatment agent may contain a solvent. Examples of the solvent include fluorinated aliphatic hydrocarbon solvents such as perfluoroheptane and perfluoroctane; fluorinated aromatic hydrocarbon solvents such as m-xylenehexafluoride, bezotrifluoride and 1,3-Bis(trifluoromethyl) benzene; fluorinated ether solvents such as methyl perfluorobutyl ether, ethyl perfluorobutyl ether, and perfluoro(2-butyltetrahydrofuran); fluorinated alkylamine solvents such as perfluorotributylamine and perfluorotripentylamine; hydrocarbon solvents such as petroleum benzene, mineral spirits, toluene, and xylene; ketone solvents such as acetone, methylethylketone, and methylisobutylketone. Among these, fluorinated solvents are preferred in view of solubility and wettability of the composition. Particularly preferred are m-xylenehexafluoride, perfluoro(2-butyltetrahydrofuran), perfluorotributylamine and ethyl perfluorobutyl ether.

A mixture of two or more of the aforesaid solvents may be used. Preferably, the fluorooxyalkylene group-containing polymer and the condensate of the hydrolyzate obtained by partially hydrolyzing the polymer composition are dissolved homogeneously. An optimum concentration of the fluorooxyalkylene group-containing polymer composition in a solvent may be decided, depending on treatment conditions, and is preferably from 0.01 to 10 wt %, particularly from 0.05 to 5 wt %.

The surface treatment agent may be applied on a substrate by any known methods, such as brushing, dipping, spraying and vapor deposition. Examples of a heating method for the vapor deposition include a resistance heating method and an electronic beam heating method, but are not limited thereto. The composition may be cured at a temperature selected depending on a curing method. When the composition is applied by brushing or dipping, a cured temperature is preferably from room temperature, i.e. 20 plus or minus 5 degrees C., to 200 degrees C. The curing is carried out preferably in a humid environment to promote the curing reaction. A thickness of a cured coating may be selected depending on the type of a substrate, and is typically from 0.1 nm to 100 nm, particularly from 1 to 20 nm.

A substrate to be treated with the present surface treatment agent may be various substrates, such as paper, cloths, metals and metal oxides, glass, plastics, ceramics and quartz, but is not limited to these. The present surface treatment agent can provide water- and oil-repellency, low dynamic friction coefficient and abrasion resistance to these substrates. In particular, the present surface treatment agent can be used suitably for glasses treated with $SiO_2$ and for quartz substrates.

Examples of an article to be treated with the present surface treatment agent include optical articles which is equipped in such as car navigation equipments, mobile phones, digital cameras, digital camcorders, PDAs', portable audio players, car audio devices, game machines, lenses of spectacles, lenses of cameras, filters for lenses, dark glasses, medical devices such as gastric cameras, copy machines, personal computers, liquid crystal displays, organic EL displays, plasma displays, touch panel displays, protection films, and anti-reflection films. The present surface treatment agent can give fingerprint proofness and abrasion resistance to these articles and, therefore, in particular, is suitable as a water- and oil-repellent layer for touch panel displays and anti-reflection films.

The present surface treatment agent further can be used suitably as water-repellent and stainproof coatings for sanitary products such as bathtubs and washbasins; stainproof coatings for window glass, tempered glass and head lamp covers in automobiles, trains and airplanes; water repellent and stainproof coatings for building materials for exterior wall; grease buildup-preventing coatings for kitchen building materials; water repellent, stainproof, poster- and graffiti-preventing coatings for telephone booths; coatings for water repellency and fingerprint prevention on artworks; coatings for preventing fingerprint on compact discs and DVDs'; release agents for nanoimprint molds; and paint additives, resin modifying agents, flow- or dispersion-modifying agents for inorganic fillers, or lubrication enhancing agents for tapes and films.

EXAMPLES

The present invention will be explained in detail by reference to the Examples and the Comparative Examples, but shall not be limited thereto.

A mixture used comprised 60 mole % of a polymer represented by the following formula (1a), 38 mole % of a polymer represented by the following formula (1b) and 2 mole % of a polymer represented by the following formula (1c). The mixture was prepared by partially fluorinating the perfluorooxy compound having carboxylic groups at the both terminals with a fluorine gas. The polymers having a carboxylic group(s) were adsorbed on an acid adsorbent and separated, and fractions of the polymers in mole % was determined by $^{19}$F-NMR analysis.

  (1a)

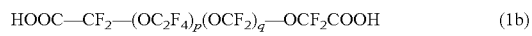  (1b)

  (1c)

wherein p/q=0.9, p+q was approximately 45.

Example 1

(i) In a reactor, 300 g of the aforesaid mixture comprising 60 mole % of polymer (1a), 38 mole % of polymer (1b) and 2 mole % of polymer (1c) were dissolved in 2.7 kg of a fluorinated solvent, PF 5060, ex 3M Co. Subsequently, 600 g of anion exchange resin, B20-HG, ex Organo Corporation, was added to the mixture and stirred at 20 degrees C. for 3 hours, and then the polymers (1a) and (1b) were adsorbed on the anion exchange resin. The anion exchange resin was washed with PF 5060 and, then, mixed with 3 kg of PF 5060, to which an appropriate amount of hydrochloric acid was added and stirred at 20 degrees C. for 3 hours. After stirred, the mixture was left standing for 30 minutes to separate in to two phases, where a lower phase was a fluorine phase and an upper phase was a mixture phase of hydrochloric acid and the resin. The fluorine phase was taken out and PF 5060 was distilled off to obtain 83 g of a product. According to $^{19}$F-NMR analysis, the product comprised 91 mole % of polymer (1a), 1 mole % of polymer (1b) and 8 mole % of polymer (1c). Thus, the content of polymer (1b) was 1.1 mole %, relative to the total moles of polymers (1a) and (1b).

(ii) 50 Grams of the mixture obtained in the aforesaid reaction was dissolved in a mixed solvent of 40 g of 1,3-bis(trifluoromethyl)benzene and 10 g of tetrahydrofuran. 30 Grams of a 40% solution of sodium bis(2-methoxyethoxy) alminium hydride in toluene was added dropwise to the mixture and stirred at room temperature for 3 hours, to which an appropriate amount of hydrochloric acid was subsequently added, sufficiently stirred, and then washed with water. A lower phase was taken out and the solvent was distilled off to obtain 40 g of a liquid product. According to $^{19}$F-NMR analysis, the product obtained comprised 91 mole % of a polymer represented by the following formula (2a), 1 mole % of a polymer represented by the following formula (2b) and 8 mole % of a polymer represented by the following formula (2c).

$$CF_3(OC_2F_4)_p(OCF_2)_q-OCF_2CH_2OH \qquad (2a)$$

$$HOH_2C-CF_2-(OC_2F_4)_p(OCF_2)_q-OCF_2CH_2OH \qquad (2b)$$

$$CF_3(OC_2F_4)_p(OCF_2)_q-OCF_3 \qquad (2c)$$

wherein p/q=0.9, p+q was approximately 45.

(iii) In a reactor, 40 g of the mixture obtained in the aforesaid step (ii), 3.5 g of brominated ally and 0.4 g of tetrabutylammonium hydrogen sulfate were placed and stirred at 50 degrees C. for 3 hours. 5.2 Grams of an aqueous 30% sodium hydroxide solution was added dropwise and aged at 55 degrees C. for 12 hours. Then, appropriate amounts of PF 5060 and hydrochloric acid were added and stirred, and washed well with water. The lower phase was taken out and the solvent was distilled off to obtain 30 g of a liquid product. According to $^{19}$F-NMR and $^1$H-NMR analysis, the product obtained comprised 91 mole % of a polymer represented by the following formula (3a), 1 mole % of a polymer represented by the following formula (3b) and 8 mole % of a polymer represented by the following formula (3c).

$$F_3C(OC_2F_4)_p(OCF_2)_q-OCF_2CH_2OCH_2CH=CH_2 \qquad (3a)$$

$$CH_2=CHCH_2OCH_2-CF_2-(OC_2F_4)_p(OCF_2)_q-OCF_2CH_2OCH_2CH=CH_2 \qquad (3b)$$

$$CF_3(OC_2F_4)_p(OCF_2)_q-OCF_3 \qquad (3c)$$

wherein p/q=0.9, p+q was approximately 45.

(iv) Subsequently, 30 g of the mixture obtained in the aforesaid step (iii), 20 g of 1,3-bis(trifluoromethyl)benzene, 3 g of trimethoxysilane and 0.10 g of a solution of a chloroplatinic acid/vinyl siloxane complex in toluene, containing 2.5×10$^{-8}$ mole of Pt, were mixed and aged at 70 degrees C. for 3 hours. Then, the solvent and unreacted compounds were distilled off under reduced pressure to obtain 30 g of a liquid product.

The $^1$H-NMR chart of the product obtained is shown in FIG. 1.

| | |
|---|---|
| —CH$_2$CH$_2$Si≡ | 0.50-0.72 ppm, 1.61-1.72 ppm |
| —SiOCH$_3$ | 3.41-3.66 ppm |
| —CH$_2$OCH$_2$— | 3.41-3.83 ppm |

According to $^1$H-NMR analysis, the product obtained comprised 91 mole % of a polymer represented by the following formula (4a), 1 mole % of a polymer represented by the following formula (4b) and 8 mole % of polymer represented by the following formula (4c). Thus, the content of polymer (4b) was 1.1 mole %, relative to the total moles of polymers (4a) and (4b). The product is hereinafter referred to as Composition 1.

$$CF_3(OC_2F_4)_p(OCF_2)_q-OCF_2CH_2OC_3H_6Si(OCH_3)_3 \qquad (4a)$$

$$(CH_3O)_3SiC_3H_6OCH_2-CF_2-(OC_2F_4)_p(OCF_2)_q-OCF_2CH_2OC_3H_6Si(OCH_3)_3 \qquad (4b)$$

$$CF_3(OC_2F_4)_p(OCF_2)_q-OCF_3 \qquad (4c)$$

wherein p/q=0.9, p+q was approximately 45.

Example 2

30 Grams of the mixture obtained in the aforesaid step (iii) were dissolved in 20 g of 1,3-bis(trifluoromethyl)benzene, to which 0.10 g of a solution of a chloroplatinic acid/vinyl siloxane complex in toluene, containing 2.5×10$^{-8}$ mole of Pt, and 2.5 g of a 1:1 adduct (HM-VMS) of tetramethyldisiloxane (HM) with vinyltrimethoxysilane (VMS) were added dropwise, and then aged at 90 degrees C. for 2 hours. Then, the solvent and unreacted compounds were distilled off under reduced pressure to obtain 31.5 g of a liquid product.

The aforesaid HM-VMS was prepared in the following process.

In a reactor, 40 g of tetramethyldisiloxane (HM) and 40 g of toluene were placed and heated to 80 degrees C., to which a mixture of 44.2 g of vinyltrimethoxysilane (VMS) and 2 g of a solution of a chloroplatinic acid/vinyl siloxane complex in toluene, containing 1.1×10$^{-7}$ mole of Pt, was added dropwise slowly. Then, the resulting mixture was purified by distillation to obtain 84 g of a 1:1 adduct (HM-VMS) represented by the following formula.

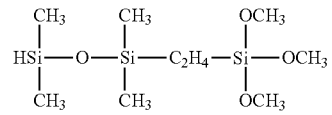

Figure 2:
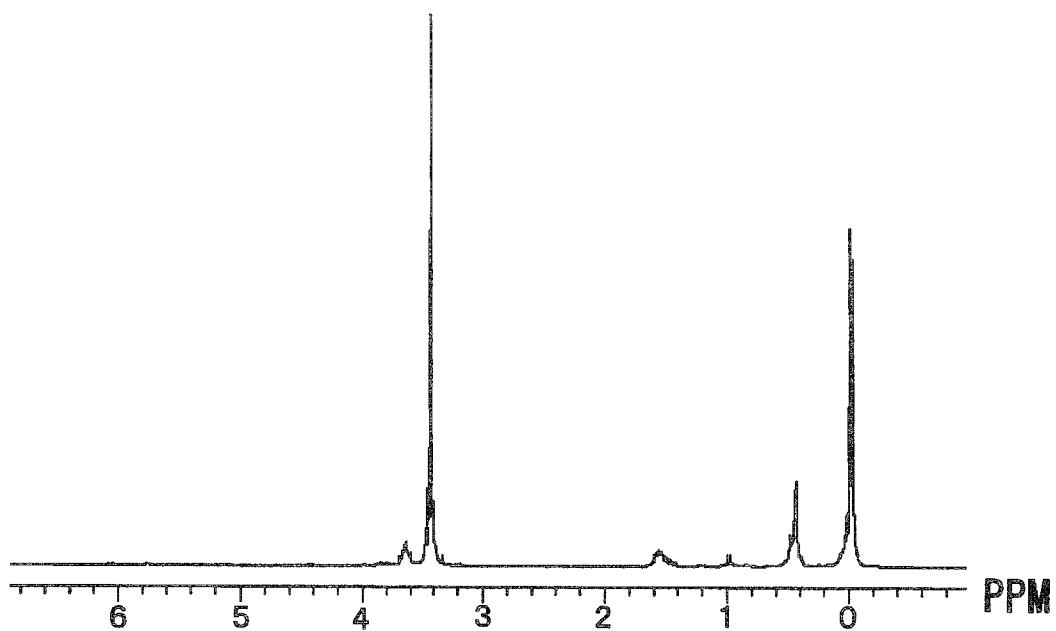
FIG. 2 is a chart of $^1$H-NMR spectra of the product prepared in Example 2.

The $^1$H-NMR chart of the product obtained in Example 2 is shown in FIG. 2.

| | |
|---|---|
| —SiCH$_3$   —CH— | 0.18-0.22 ppm |
| ≡SiCH$_2$CH$_2$Si≡ | 0.34-0.61 ppm |
| CH$_3$ | 0.54-1.07 ppm |

| | |
|---|---|
| —CH$_2$CH$_2$Si≡ | 1.45-1.70 ppm |
| —SiOCH$_3$ | 3.32-3.58 ppm |
| —CH$_2$OCH$_2$— | 3.32-3.74 ppm |

According to $^1$H-NMR analysis, the product obtained comprised 91 mole % of a polymer represented by the following formula (5a), 1 mole % of a polymer represented by the following formula (5b) and 8 mole % of a polymer represented by the following formula (5c). Thus the content of polymer (5b) was 1.1 mole %, relative to the total moles of polymers (5a) and (5b). The product is hereinafter referred to as Composition 2.

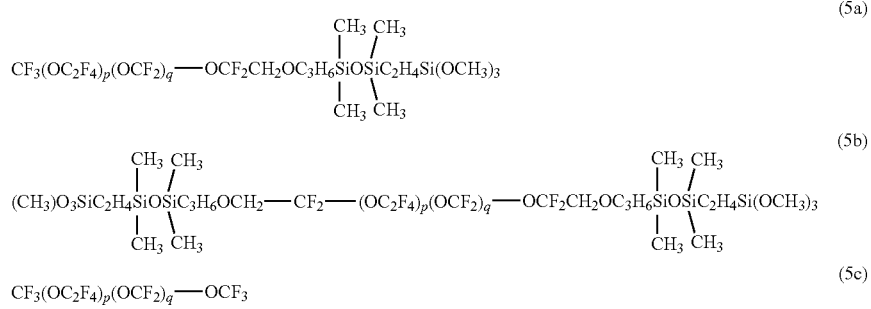

wherein p/q=0.9, p+q was approximately 45.

Examples 3 to 6 and Comparative Examples 1 and 2

The both-terminal modified polymer represented by the aforesaid formula (4b) was added to the Composition 1 obtained in Example 1 to prepare compositions having the mixing ratios in mole % shown in the following Table 1.

TABLE 1

| | Mixing ratio, mole % | | | 4b/(4a + 4b), mole % |
|---|---|---|---|---|
| | 4a | 4b | 4c | |
| Example 3 | 88 | 4 | 8 | 4.3 |
| Example 4 | 87 | 6 | 7 | 6.5 |
| Example 5 | 86 | 7 | 7 | 7.5 |
| Example 6 | 84 | 9 | 7 | 9.7 |
| Com. Ex. 1 | 83 | 10 | 7 | 10.8 |
| Com. Ex. 2 | 79 | 14 | 7 | 15.1 |

Comparative Examples 3 to 9

Compounds and compositions used in Comparative Examples 3 to 9 were as follows.

Comparative Example 3

CF$_3$(OC$_2$F$_4$)$_p$(OCF$_2$)$_q$—OCF$_2$CH$_2$OC$_3$H$_6$Si(OCH$_3$)$_3$ wherein p/q=0.9, p+q was approximately 45.

Comparative Example 4

A mixture comprised 95 mole % of a polymer represented by the following formula (6a) and 5 mole % of a polymer represented by the following formula (6b).

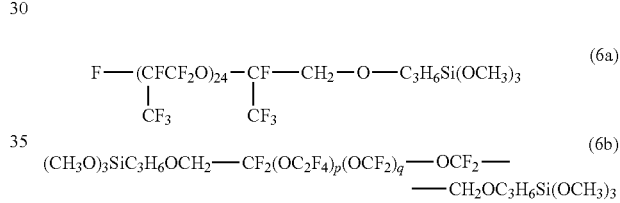

wherein p/q=0.9, p+q was approximately 45.

Comparative Example 5

(CH$_3$O)$_3$SiC$_3$H$_6$OCH$_2$—CF$_2$(OC$_2$F$_4$)$_p$(OCF$_2$)$_q$—OCF$_2$—CH$_2$OC$_3$H$_6$Si(OCH$_3$)$_3$ wherein p/q=0.9, p+q was approximately 45.

Comparative Example 6

A composition comprised 50 mole % of a polymer represented by the following formula (7a), 25 mole % of a polymer represented by the following formula (7b) and 25 mole % of a polymer represented by the following formula (7c).

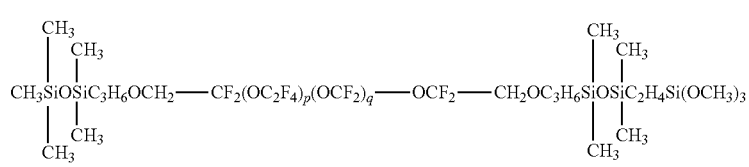

$$(CH_3O)_3SiC_2H_4\underset{\underset{CH_3}{|}}{\overset{\overset{CH_3}{|}}{Si}}O\underset{\underset{CH_3}{|}}{\overset{\overset{CH_3}{|}}{Si}}C_3H_6OCH_2CF_2(OC_2F_4)_p(OCF_2)_q-OCF_2-CH_2OC_3H_6\underset{\underset{CH_3}{|}}{\overset{\overset{CH_3}{|}}{Si}}O\underset{\underset{CH_3}{|}}{\overset{\overset{CH_3}{|}}{Si}}C_2H_4Si(OCH_3)_3 \quad (7b)$$

$$CH_3\underset{\underset{CH_3}{|}}{\overset{\overset{CH_3}{|}}{Si}}O\underset{\underset{CH_3}{|}}{\overset{\overset{CH_3}{|}}{Si}}C_3H_6OCH_2-CF_2(OC_2F_4)_p(OCF_2)_q-OCF_2-CH_2OC_3H_6\underset{\underset{CH_3}{|}}{\overset{\overset{CH_3}{|}}{Si}}O\underset{\underset{CH_3}{|}}{\overset{\overset{CH_3}{|}}{Si}}CH_3 \quad (7c)$$

wherein p/q=0.9, p+q was approximately 45.

Comparative Example 7

$$(CH_3O)_3SiC_2H_4\underset{\underset{CH_3}{|}\;\underset{CH_3}{|}}{\overset{\overset{CH_3}{|}\;\overset{CH_3}{/}}{Si}}O\underset{}{Si}C_3H_6OCH_2CF_2(OC_2F_4)_p(OCF_2)_q-OCF_2-CH_2OC_3H_6\underset{\underset{CH_3}{/}\;\underset{CH_3}{\backslash}}{\overset{\overset{CH_3}{\backslash}\;\overset{CH_3}{|}}{Si}}O\underset{}{Si}C_2H_4Si(OCH_3)_3$$

wherein p/q=0.9, p+q was approximately 45.

Comparative Example 8

$$F-(CFCF_2O)_{24}-\underset{\underset{CF_3}{|}}{\overset{}{C}F}-\underset{\underset{CF_3}{|}}{\overset{}{C}}ONH-C_3H_6Si(OCH_3)_3$$

Comparative Example 9

$$F-(CFCF_2O)_{24}-\underset{\underset{CF_3}{|}}{\overset{}{C}F}-\underset{\underset{CF_3}{|}}{\overset{}{C}}H_2-O-C_3H_6Si(OCH_3)_3$$

Preparation of Surface Treatment Agents and Cured Coatings

The fluorooxyalkylene group-containing polymer compositions or compounds of Examples 1 to 6 and Comparative Examples 1 to 9 were dissolved in 1,3-bis(trifluoromethyl) benzene in a 20 wt % concentration to obtain surface treatment agents. 10 Milligrams of each treatment agent was vacuum deposited on each glass whose outermost surface had been treated with 10 nm of $SiO_2$, Gorilla, ex Corning Incorporated, at a pressure of $9.0 \times 10^{-4}$ Pa and a temperature of 740 degrees C., and was left at 40 degrees C. and 80% humidity for 2 hours to form a cured coating.

The cured coatings obtained were evaluated in the following method. The results are shown in Table 2.

Evaluation of Water- and Oil-Repellency

Using a contact angle meter, Drop Master, ex Kyowa Interface Science Co., Ltd., a water contact angle and an oleic acid, contact angle of the cured coatings were measured.

Dynamic Friction Coefficient

The dynamic friction coefficient against Bemcot, ex Asahi Kasei, was measured in the following conditions with a surface property test machine, 14FW, ex Shinto Scientific Co., Ltd.

Contact area: 35 mm×35 mm

Load: 200 g

Scrub Resistance

Using a rubbing tester, ex Shinto Scientific Co., Ltd., the cured coating was scrubbed under the following conditions, and then a water contact angle was determined. Test environment was 25 degrees C. and the relative humidity of 40%.

1. Scrub Resistance Against Cloth

Cloth: Bemcot, ex Asahi Kasei Corporation

Scrub distance (one way): 30 mm

Scrub speed: 1800 mm/min

Load: 2 kg/cm$^2$

Number of scrubbing: 50,000 times

2. Scrub Resistance Against an Eraser

Eraser: EB-SNP, ex TOMBOW Co., Ltd.

Scrub distance (one way): 30 mm

Scrub speed: 1800 mm/min

Load: 1 kg/cm$^2$

Number of scrubbing: 10,000 times

3. Scrub Resistance Against a Steel Wool

Steel wool: BONSTAR #0000, ex Nippon Steel Wool Co., Ltd.

Scrub distance (one way): 30 mm

Scrub speed: 1800 mm/min

Load: 1 kg/cm$^2$

Number of scrubbing: 10,000 times

TABLE 2

| | Initial values | | | After scrubbed | | |
| --- | --- | --- | --- | --- | --- | --- |
| | | | | Cloth | Eraser | Steel wool |
| | Water repellency (°) | Oil repellency (°) | Dynamic friction coefficient | Water repellency (°) | Water repellency (°) | Water repellency (°) |
| Example 1 | 114 | 73 | 0.03 | 114 | 113 | 111 |
| Example 2 | 115 | 73 | 0.02 | 114 | 114 | 110 |
| Example 3 | 114 | 73 | 0.02 | 112 | 111 | 110 |
| Example 4 | 114 | 73 | 0.03 | 112 | 112 | 110 |
| Example 5 | 115 | 73 | 0.03 | 112 | 111 | 111 |
| Example 6 | 113 | 72 | 0.03 | 112 | 112 | 110 |
| Comparative Example 1 | 113 | 71 | 0.04 | 111 | 112 | 105 |
| Comparative Example 2 | 112 | 71 | 0.04 | 112 | 109 | 98 |
| Comparative Example 3 | 115 | 73 | 0.04 | 107 | 108 | 100 |
| Comparative Example 4 | 113 | 73 | 0.21 | 67 | 69 | 53 |
| Comparative Example 5 | 110 | 70 | 0.10 | 106 | 106 | 64 |
| Comparative Example 6 | 107 | 66 | 0.07 | 107 | 98 | 76 |
| Comparative Example 7 | 110 | 68 | 0.10 | 108 | 73 | 79 |
| Comparative Example 8 | 115 | 74 | 0.24 | 84 | 75 | 46 |
| Comparative Example 9 | 115 | 75 | 0.23 | 56 | 64 | 49 |

The cured coatings prepared in Comparative Examples 1 and 2 formed from the surface treatment agents containing more than 10 mole % of the both-terminal modified polymer had poor scrub resistance against steel wool. The cured coating prepared in Comparative Example 3 formed from the surface treatment agent which did not contain the both-terminal modified polymer had poor abrasion resistance. The cured coating prepared in Comparative Example 4 formed from the surface treatment agent where the main chain of the one-terminal modified polymer does not comprise —$(OC_2F_4)_e(OCF_2)_f$— structure had a high dynamic friction coefficient and poor abrasion resistance. The cured coatings prepared in Comparative Examples 5 and 7 formed from the surface treatment agents which comprises only the both-terminal modified polymer had poor water- and oil-repellency, a high dynamic friction coefficient and poor abrasion resistance. The cured coating prepared in Comparative Example 6 formed from the surface treatment agent where the polymer did not have a fluorine atom at the terminal had poor water- and oil-repellency and abrasion resistance. The cured coatings prepared in Comparative Examples 8 and 9 formed from the surface treatment agents where the fluorooxyalkylene group-containing polymer had branch structures had a high dynamic friction coefficient and poor abrasion resistance. In contrast, the surface treatment agents prepared in Examples 1 to 6 provided a cured coating which had good water- and oil-repellency, a lower dynamic friction coefficient, good abrasion resistance and good scrub resistance and, therefore, could almost maintain the properties of the coating after scrubbed by the steel wool many times.

INDUSTRIAL APPLICABILITY

The present fluorooxyalkylene group-containing polymer composition can provide a coating which has excellent water- and oil-repellency, a low dynamic friction, good abrasion resistance, in particular, water- and oil-repellent layer having good scrub resistance. Therefore, the surface treatment agent comprising the present fluorooxyalkylene group-containing polymer composition can be used suitably for a water- and oil-repellent layer in optical articles, in particular, such as touch panel displays and anti-reflection films.

The invention claimed is:

1. A fluorooxyalkylene group-containing polymer composition comprising a liner fluorooxyalkylene group-containing polymer represented by the following formula (1):

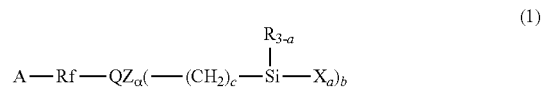

(1)

wherein Rf is represented by —$(CF_2)_d$—$(OC_2F_4)_e(OCF_2)_f$—$O(CF_2)_d$—, A is a monovalent fluorinated group having a $CF_3$ group at a terminal, Q is a divalent organic group, Z is a divalent to octavalent organopolysiloxane moiety having a siloxane bond, R is an alkyl group having 1 to 4 carbon atoms or a phenyl group, X is a hydrolysable group, a is 2 or 3, b is an integer of from 1 to 6, c is an integer of from 1 to 5, α is 0 or 1, d is, independently of each other, 0 or an integer of from 1 to 5, e is an integer of from 0 to 80, f is a positive integer which is not zero and is at most 80, and a total of e and f is from 5 to 100, and these repeating units may be sequenced at random, said polymer being hereinafter called "one-terminal modified polymer";

a liner fluorooxyalkylene group-containing polymer represented by the following formula (2):

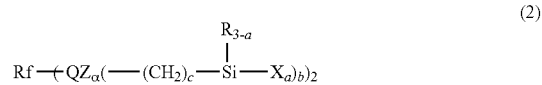

(2)

wherein Rf, Q, Z, R, X, a, b, c and α are as defined above, said polymer being hereinafter called "both-terminal modified polymer", wherein an amount of the both-terminal modified polymer is 0.1 mole % or more and less than 10 mole %, relative to a total mole of the one-terminal modified polymer and the both-terminal modified; and a fluorooxyalkylene group-containing polymer represented by the following formula (3):

(3)

wherein Rf and A are as defined above, hereinafter called "non-modified polymer", wherein an amount of the one-terminal modified polymer is 80 mole % or more and an amount of the both-terminal modified polymer is 0.1 mole % or more and less than 10 mole %, relative to a total mole of the one-terminal modified polymer, the both-terminal modified polymer and the non-modified polymer.

2. The fluorooxyalkylene group-containing polymer composition according to claim 1, wherein an amount of the non-modified polymer is 1 to 15 mole %, relative to a total mole of the one-terminal modified polymer, the both-terminal modified polymer and the non-modified polymer.

3. The fluorooxyalkylene group-containing polymer composition according to claim 1, wherein Z is a liner or cyclic organopolysiloxane moiety having 2 to 5 silicon atoms.

4. The fluorooxyalkylene group-containing polymer composition according to claim 1, wherein Q is a substituted or unsubstituted hydrocarbon group having 2 to 12 carbon atoms and may have one or more bond selected from the group consisting of an amide bond, an ether bond, an ester bond and an ethylene bond.

5. The fluorooxyalkylene group-containing polymer composition according to claim 1, wherein X is a group selected from the group consisting of alkoxy groups having 1 to 10 carbon atoms, oxyalkoxy groups having 2 to 10 carbon atoms, acyloxy groups having 1 to 10 carbon atoms, alkenyloxy groups having 2 to 10 carbon atoms and halogen atoms.

6. A surface treatment agent comprising the fluorooxyalkylene group-containing polymer composition according to claim 1 and/or a product obtained by partial hydrolyzation and condensation of the fluorooxyalkylene group-containing polymer composition.

7. A method for preparing the fluorooxyalkylene group-containing polymer composition according to claim 1, wherein the method comprises a step of subjecting a mixture of a fluorooxyalkylene group-containing polymer having a carboxylic acid group at one terminal, hereinafter called "one-terminal carboxylic acid polymer", and a fluorooxyalkylene group-containing polymer having carboxylic acid groups at the both terminals, hereinafter called "both-terminal carboxylic acid polymer", to adsorption treatment and/or molecular distillation, and providing a polymer composition having 0.1 mole % or more and less than 10 mole % of the both-terminal carboxylic acid polymer, relative to a total mole of the one-terminal carboxylic acid polymer and the both-terminal carboxylic acid polymer.

8. An article treated with the surface treatment agent according to claim 6.

9. An optical article treated with the surface treatment agent according to claim 6.

10. A touch panel display treated with the surface treatment agent according to claim 6.

11. An anti-reflection film treated with the surface treatment agent according to claim 6.

12. A glass treated with $SiO_2$ and further treated with the surface treatment agent according to claim 6.

13. A tempered glass treated with the surface treatment agent according to claim 6.

14. A quartz substrate treated with the surface treatment agent according to claim 6.

* * * * *